May 15, 1923.
J. F. STRAUBE
1,455,233
ANTISKID CHAIN FOR AUTOMOBILES
Filed March 26, 1921
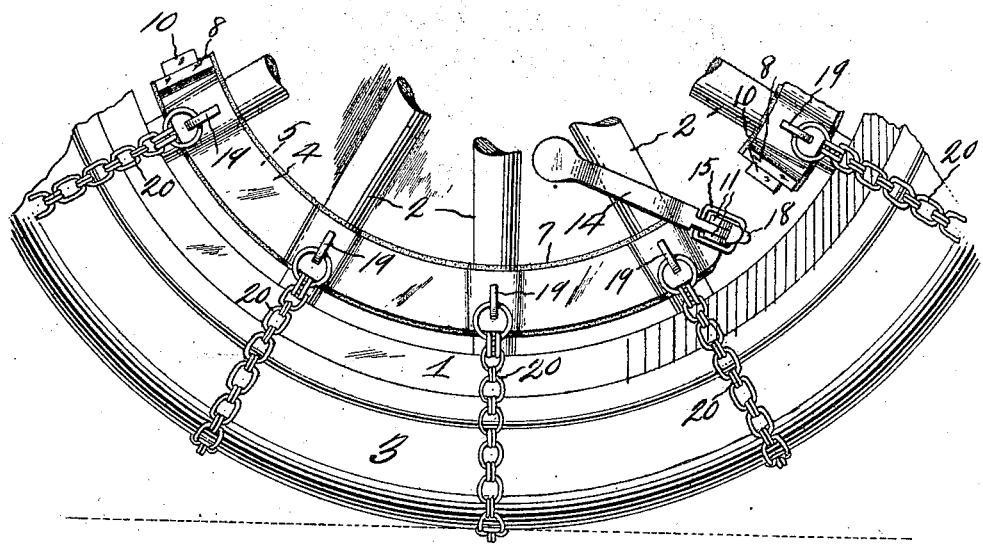
Fig. 1
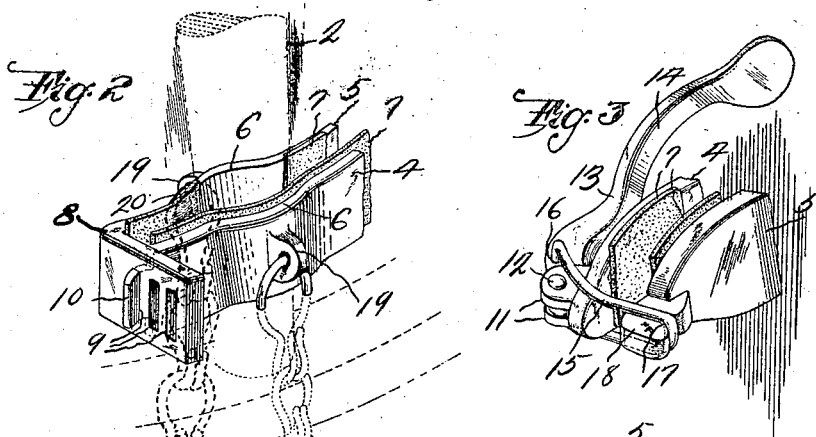
Fig. 2
Fig. 3
Fig. 4
Fig. 5
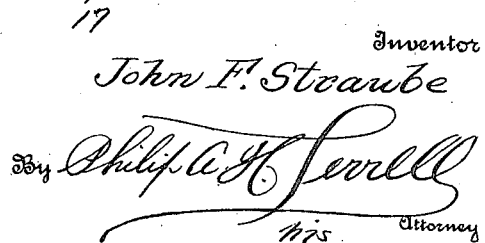
Inventor
John F. Straube Patented May 15, 1923.

1,455,233

UNITED STATES PATENT OFFICE.

JOHN F. STRAUBE, OF OMAHA, NEBRASKA.

ANTISKID CHAIN FOR AUTOMOBILES.

Application filed March 26, 1921. Serial No. 455,881.

*To all whom it may concern:*

Be it known that JOHN F. STRAUBE, a citizen of the United States, residing at Omaha, in the county of Douglas and State of Nebraska, has invented certain new and useful Improvements in Antiskid Chains for Automobiles, of which the following is a specification, reference being had therein to the accompanying drawing.

The invention relates to antiskidding devices for automobile wheels and has for its object to provide a device of this character comprising a pair of segmentally shaped plates provided with spaced recesses in registration with each other adapted to receive and clamp on a plurality of spokes of an automobile wheel. Also to provide the plates with eyes oppositely disposed to which are connected the ends of chains which pass around the automobile tire.

A further object is to provide one of the segmentally shaped plates with a right angled portion provided with a plurality of apertures for the reception of a curved lug carried by the adjacent end of the other plate, said lug and apertures forming means whereby the plates may be clamped on various diameters of spokes. Also to provide a link and lever locking device at the opposite ends of the plates by means of which the plates may be securely clamped in place on the spokes.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a portion of an automobile wheel showing the device applied thereto.

Figure 2 is a perspective view of one end of the segmentally shaped plates showing their interlocking means.

Figure 3 is a perspective view of the clamping means for clamping and holding the segmental plates on the spokes of the wheel.

Figure 4 is a detail perspective view of the lug carried by one of the segmental plates which lug is engaged by the lever link.

Figure 5 is a detail perspective view of the lug carried by one end of one of the plates for engaging the apertures in the right angled portion of the other plate.

Referring to the drawing, the numeral 1 designates a portion of a conventional form of automobile wheel, and 2 the spokes thereof. The wheel 1 is provided with a conventional form of tire 3. The antiskidding device comprises spaced plates 4 and 5 which are segmentally shaped and are adapted to engage opposite sides of the spokes 2 and be securely clamped thereon. The plates 4 and 5 are provided with segmentally shaped recesses 6, which receive the spokes and prevent circumferential slipping of the plates as the wheel rotates over the ground, there being felt linings 7 in the plates for preventing the plates from marring the finish of the spokes 2. One end of the plate 5 is provided with right angled portion 8 having a series of elongated apertures 9, said apertures being adapted to receive the curved lug 10 carried by the adjacent end of the plate 4. By providing the lug and aperture connection it will be seen that the plates may be applied to various thicknesses of spokes or to various designs of spokes. The plate 4 at the opposite end to the lug 10 is provided with spaced ears 11 between which ears is pivotally secured as at 12 a lever 13. The lever is curved as at 14 so that it will come into engagement with one of the spokes 2 when in closed position, that is after the link 15 which is pivoted as at 16 to the lever 13 and has been placed in engagement with the crotch 17 of the lug 18 carried by the end of the plate 5 has been forced inwardly for carrying the pivotal point 16 of the link 15 beyond the pivotal point 12 of the lever 13. By providing the lever and link connections 13 and 15 as shown in Figure 3, it will be seen that the segmental plates 4 and 5 may be quickly applied and clamped on the spokes 2 and that said plates may be easily and quickly removed.

Plates 4 and 5 are provided with eyes 19, to which eyes are connected antiskid chains 20, said antiskid chains extend around the tire 3 and are connected to the segmental plates 4 and 5 thereby preventing loss of the plates and maintaining the same together at all times.

From the above it will be seen that an antiskidding device is provided which may be quickly applied to a wheel and quickly removed. The device is preferably made so as to engage three or four spokes and if so desired a plurality of devices may be applied to a wheel.

The invention having been set forth what is claimed as new and useful is:—

An antiskid device for automobile wheels comprising a pair of segmentally shaped plates, spaced recesses carried by said plates in registration with each other and adapted to receive the spokes of an automobile wheel, one end of one of the plates being provided with a right angled portion overlying the adjacent end of the other plate, a plurality of apertures in said right angled portion, a lug carried by the adjacent end of the other segmentally shaped plate and adapted to be received in one of the apertures according to the diameter of the spokes and means cooperating with the other adjacent ends of the segmentally shaped plates for forcing the same towards each other for securely clamping the plates against the opposite sides of the spokes.

In testimony whereof I hereunto affix my signature.

JOHN F. STRAUBE.